United States Patent
Heinloth et al.

(10) Patent No.: US 6,273,651 B1
(45) Date of Patent: Aug. 14, 2001

(54) CUTTING TIP FOR CUTTING OUT PROFILES

(75) Inventors: Markus Heinloth, Postbauer-Heng; Jürgen Zastrozynski, Düsseldorf, both of (DE)

(73) Assignee: Widia GmbH, Essen (DE)

( * ) Notice: Subject to any disclaimer, the term of this patent is extended or adjusted under 35 U.S.C. 154(b) by 0 days.

(21) Appl. No.: 09/486,961
(22) PCT Filed: Sep. 2, 1998
(86) PCT No.: PCT/DE98/02635
§ 371 Date: Mar. 3, 2000
§ 102(e) Date: Mar. 3, 2000
(87) PCT Pub. No.: WO99/12685
PCT Pub. Date: Mar. 18, 1999

(30) Foreign Application Priority Data

Sep. 8, 1997 (DE) ............................................. 197 39 300

(51) Int. Cl.[7] ................................................... B23B 27/06
(52) U.S. Cl. ............................. 407/116; 407/117; 407/120
(58) Field of Search .................................. 407/114, 115, 407/116, 117, 120

(56) References Cited

U.S. PATENT DOCUMENTS

| | | | |
|---|---|---|---|
| Re. 30,908 | * | 4/1982 | Griedline et al. .................... 407/114 |
| 490,638 | * | 1/1893 | Clough .................................. 407/20 |
| 2,836,240 | * | 5/1958 | Nuding .................................. 407/118 |
| 3,436,799 | * | 4/1969 | Koyp ..................................... 407/77 |
| 3,813,746 | * | 6/1974 | Price ..................................... 407/104 |
| 4,669,925 | * | 6/1987 | Lowe et al. ........................... 407/114 |
| 5,032,050 | * | 7/1991 | Niebauer et al. ..................... 407/114 |

FOREIGN PATENT DOCUMENTS

| | | |
|---|---|---|
| 195 28 851 A1 | 2/1997 | (DE) . |
| 195 46 196 A1 | 6/1997 | (DE) . |
| 0 058 972 A1 | 9/1982 | (EP) . |
| 891 146 | 2/1944 | (FR) . |
| 1 113 475 | 5/1968 | (GB) . |
| WO 90/14930 | 12/1990 | (WO) . |
| WO 94/27768 | 12/1994 | (WO) . |
| WO 95/25618 | 9/1995 | (WO) . |

* cited by examiner

*Primary Examiner*—Henry Tsai
(74) *Attorney, Agent, or Firm*—Herbert Dubno

(57) ABSTRACT

A cutting insert has a generally parallepipedal body formed with a pair of generally rectangular, planar, and parallel side faces, a mounting formation at at least one of the side faces, a pair of opposite edge faces between the side faces and each forming at each end of the body a cutting face bounded by a cutting edge, and a respective pair of at least partially circularly arcuately concave free faces at each end extending between the respective cutting edges. The cutting edges are arcuate and each cutting edge has a convex part and straight or concave part.

11 Claims, 7 Drawing Sheets

CUTTING TIP FOR CUTTING OUT PROFILES

CROSS REFERENCE TO RELATED APPLICATIONS

This application is the US national phase of PCT application PCT/DE98/02635 filed Sep. 2, 1998 with a claim to the priority of German application 19739300.4 filed Sep. 8, 1997.

FIELD OF THE INVENTION

The invention relates to a cutting insert for cutting profiles, in particular for milling profiled grooves in rotating workpieces such as crank shafts, by means of a generally parallepipedal base body having at least two usable cutting edges and two parallel planar side faces that are traversed by a mounting hole or provided with a seat for engaging a clamping arm, two edge faces that have on their opposite ends respective cutting faces bounded by a cutting edge shaped like the profile to be made, and two free faces between the opposite cutting edges.

BACKGROUND OF THE INVENTION

In the finishing of crank or cam shafts a number of different milling operations are used, the movements for the milling operations to be performed being made complex by the partially eccentric bearing or shaft pins. Ia system described for example in German 195 46 196 a workpiece, for example a crank shaft, is held with its ends in rotatably driven chucks such that it is rotatable about its central longitudinal axis. High-speed disk which are rotatable on a support are used for machining so that the workpiece can be followed.

In order to make a complete shape that is formed of a pair of undercut fillets and a machined pin, different cutting bodies are used to produce the undercut fillet and the cylindrical shape than are used for machining the pin of a crank-shaft bearing support. In order to make the undercut fillets the above-described cutting insert is used. The cutting inserts in question are secured by mounting screws in tool holders, and millers have cassettes with seats in which the cutting inserts are set and secured by a mounting screw.

Further uses of the above-described cutting inserts are in copy lathing.

With cutting inserts of the above-described type there are particular difficulties when an insufficient free angle is available for optimizing the radial and/or axial position. An increase in the free angle by minimizing the flank angle leads to overloading of the cutting edge. The likelihood of premature breakage of the cutting edge reduces the service life of the tool. The profile to be milled causes forces to be exerted in different directions on the cutting insert, making a stable mounting of the cutting insert in its seat difficult.

OBJECT OF THE INVENTION

It is therefore an object of the present invention to provide a cutting insert of the above-described type that is sure to have a flexible mounting position with optimal angling of the cutting insert and which performs plunge milling operations better than the prior-art cutting inserts.

SUMMARY OF THE INVENTION

This object is attained by a cutting insert wherein the free faces are at least partially circularly arcuately concave. The concave formation of the free face increases the free angle and produces toward the middle of the free face a large empty space, that is a spacing from the workpiece being milled that can be preferably 0.3 to 1 mm and that permits the desired tipping of the cutting insert relative to the workpiece.

Thus the cutting edge is arcuate, preferably having a projecting convexly curved part and an immediately adjacent concavely curved part so that for example the convex part serves to cut the fillet and the concave part the radial transition from the fillet to the adjacent cylindrical surface. Other cutting-edge profiles are possible according to the invention up to and including a multi-tooth cutting edge.

To further stabilize the cutting edge preferably a face region immediately adjacent the convex cutting edge part extends at a free angle of 0° while the adjacent free-face region is concave. In addition to stabilizing the cutting edge at the front the 0° free-face shape serves as rear abutment face of the cutting insert in the holder seat. The negative free-face region is thus restricted along the convex cutting-edge part in its width as in its height, which preferably lie between 0.2 and 2 mm.

According to a further embodiment of the invention the radii of curvature other than those of the free-face region are shave centers are generally so shaped through the profile region of the cutting-edge parts that their centers lie on a common vertical axis (perpendicular to the extended support surface of the cutting insert). The cutting face can be formed as a cutting-face recess, convex, planar at the cutting edge, with a positive, negative, or 0° cutting angle. If the recess shape is used, measured parallel to a longitudinal axis, the cutting angle of one of the cutting-face recesses is along the entire cutting edge between 0° and 30°, preferably 20°. In this manner except at the cutting-edge region with the 0° free-face region, there are sharp cutting edges with a relatively strongly wedge angle.

According to a further embodiment of the invention the cutting edge is of wavy shape, a line running along the wavy edge having convex and concave parts. This embodiments covers profile cutting plates with multiple teeth in single or double models where the upper and the lower edges are used for machining. The teeth formed by the wavy cutting-edge shape have flank angles between 5° and 25°. In this manner there are several small-radius main and auxiliary cutting edges that are arrayed one after the other on plunging of the tool into the workpiece and that with each successive advance served to progressively smooth the cut surface which is later subjected to polishing.

According to a further embodiment of the invention there are overall eight usable cutting edges in a cutting insert formed mirror symmetrical to a plane parallel to one of the two outer edge faces. In this way and manner the cutting edges on one side of the cutting insert can be used for the left-hand undercut fillets and the two other for right-hand undercuts. The same is true for the four cutters at the opposite end.

It is furthermore possible to form the cutting faces with concave and/or convex chip-shaping elements, that is chip-shaping grooves, hollows, and/or bumps which are known in the prior art, as for example ribs or elongated grooves that lift and deflect the chip. The cutting insert has according to the selected cutting direction either a hole for receiving a mounting screw or a recess for a clamping arm or dog.

BRIEF DESCRIPTION OF THE DRAWING

Embodiments of the invention are shown in the drawing. Therein.

SPECIFIC DESCRIPTION

Figure 1:
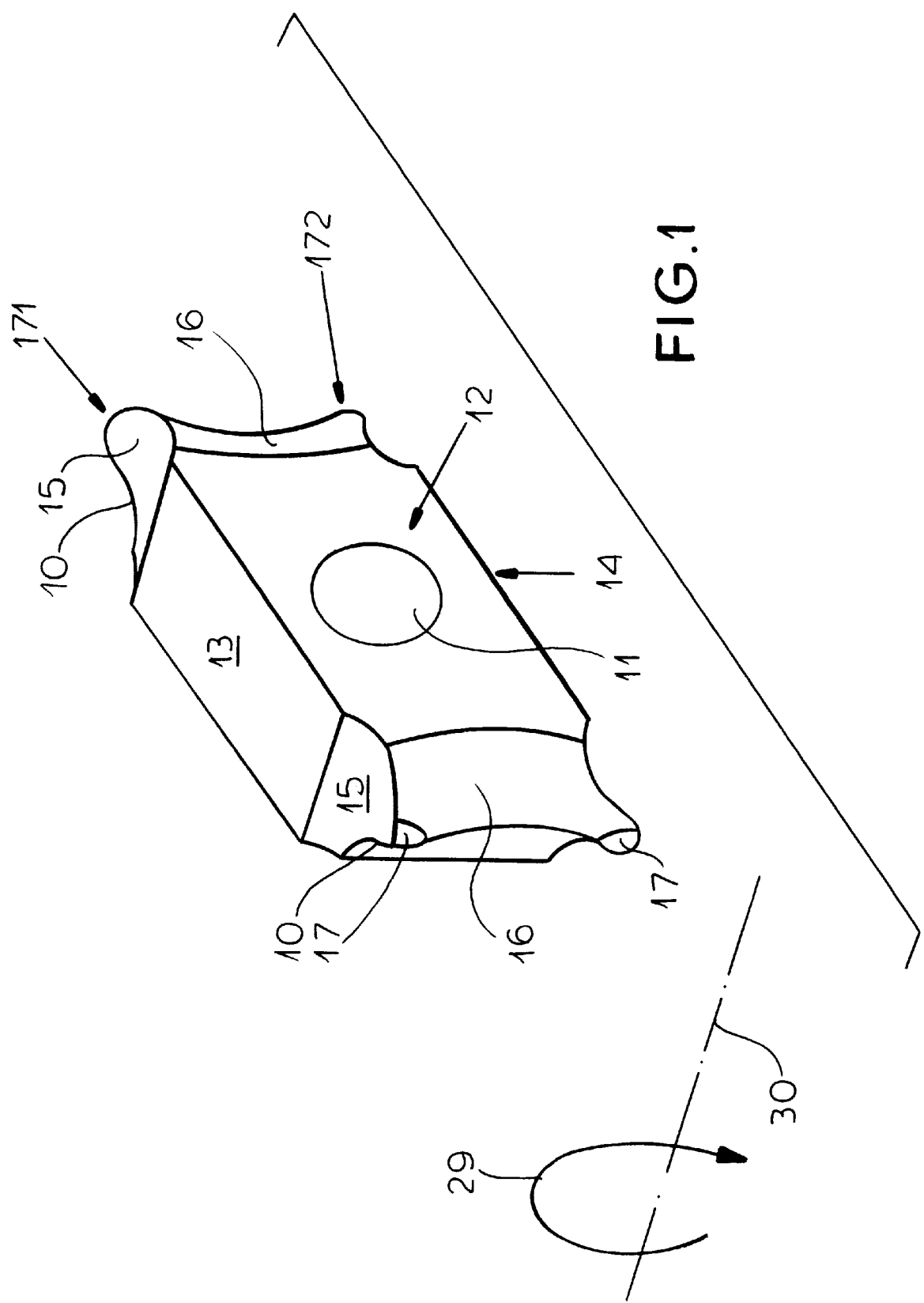
FIG. 1 is a perspective view of a cutting insert according to the invention.
Figure 2:
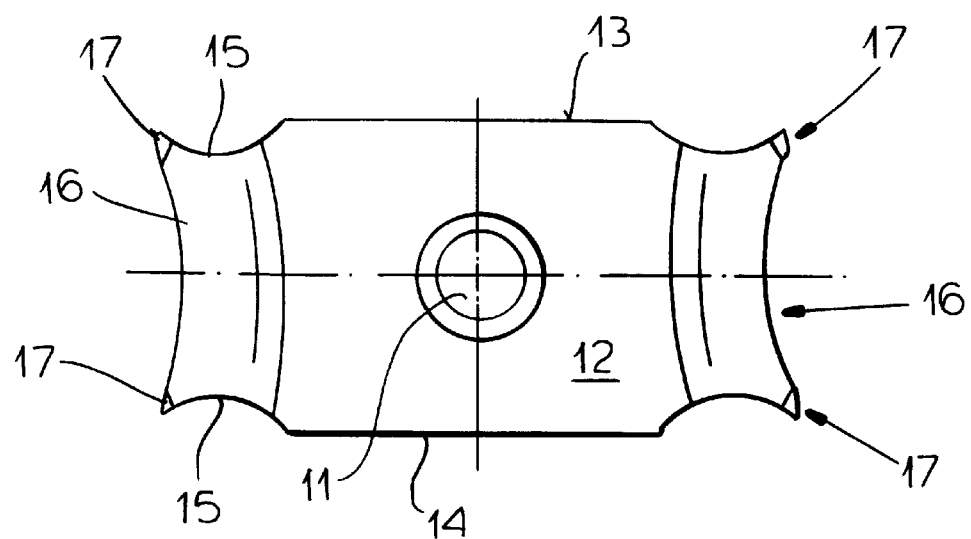
FIG. 2 is a plan view of a side face of the cutting insert according to FIG. 1.
Figure 3:
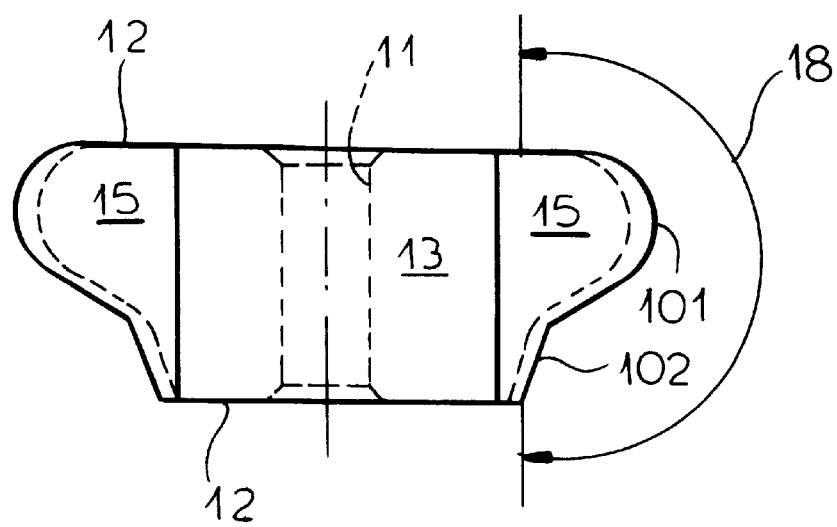
FIG. 3 is a plan view on an edge face and of the recess at the ends of the cutting insert according to FIG. 1.

As shown in FIGS. 1 to 3, the cutting insert has a basically parallepipedal basic shape with at least two usable cutting edges 10, two parallel planar side faces 12 traversed by a mounting hole 11, two edge faces 13 and 14 that each have on their opposite ends a cutting face defined by the described arcuate cutting edges 10 and here formed as a cutting recess 15, and two free faces 16 that are concave except in free-face regions 17.

Figure 10:
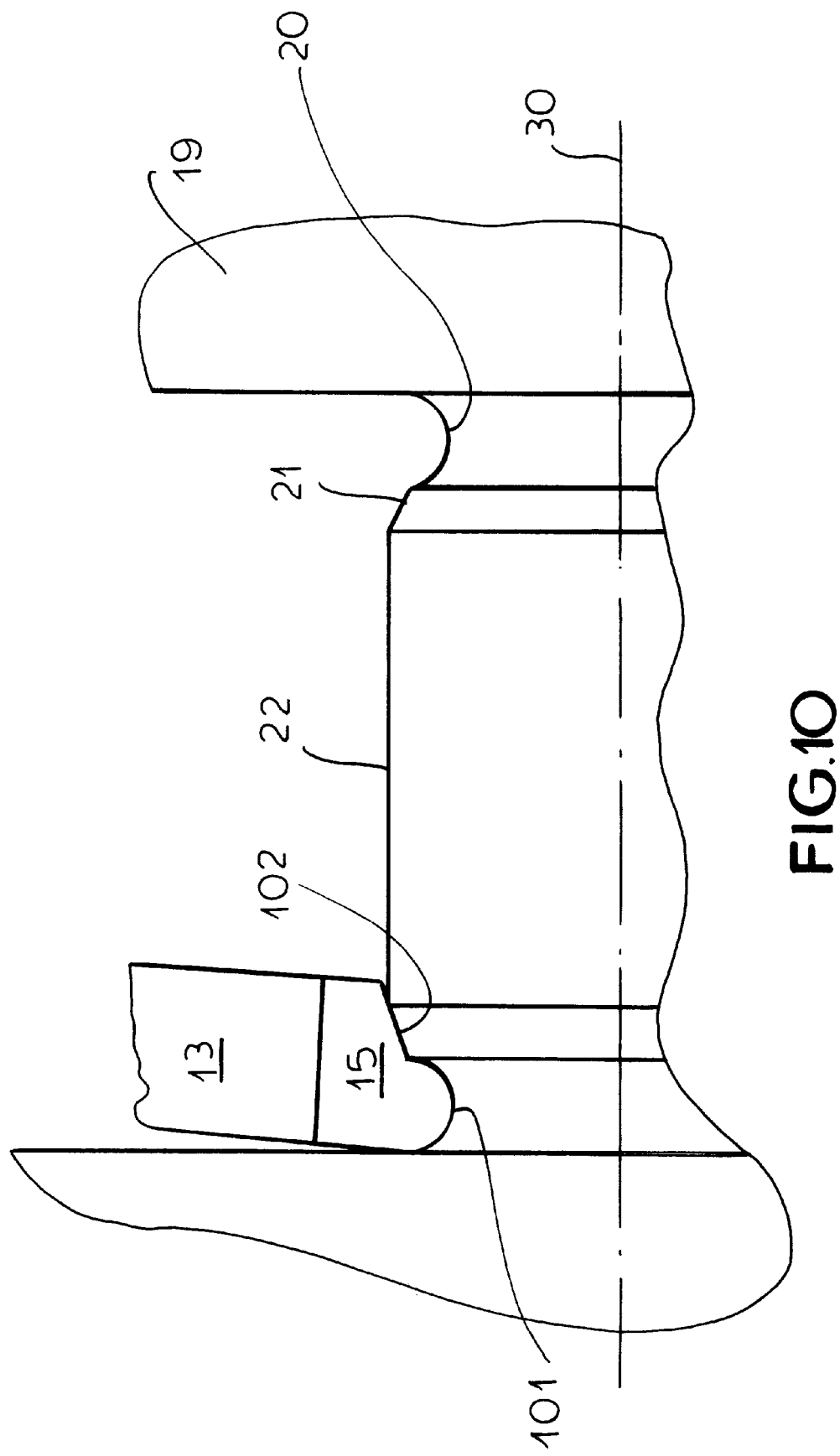
FIG. 10 is a cutting insert according to FIG. 1 in use.

FIGS. 3 and 10 show the profile region 18 during milling or plunge cutting with a cutting tool or milling insert on a crank shaft 19 which (see FIG. 2) is rotated about an axis 30 in the direction of arrow 29. The cutting edge has a convex tongue-shaped projecting part 101 as well as a concave and if necessary straight part 102 that together form the cutting edge. The cutting-edge parts 101 serve to form undercut fillets 20 to which end the concave or straight free-face part 102 cuts a transition region 21 from the undercut fillet to a cylindrical face 22.

Figure 4:
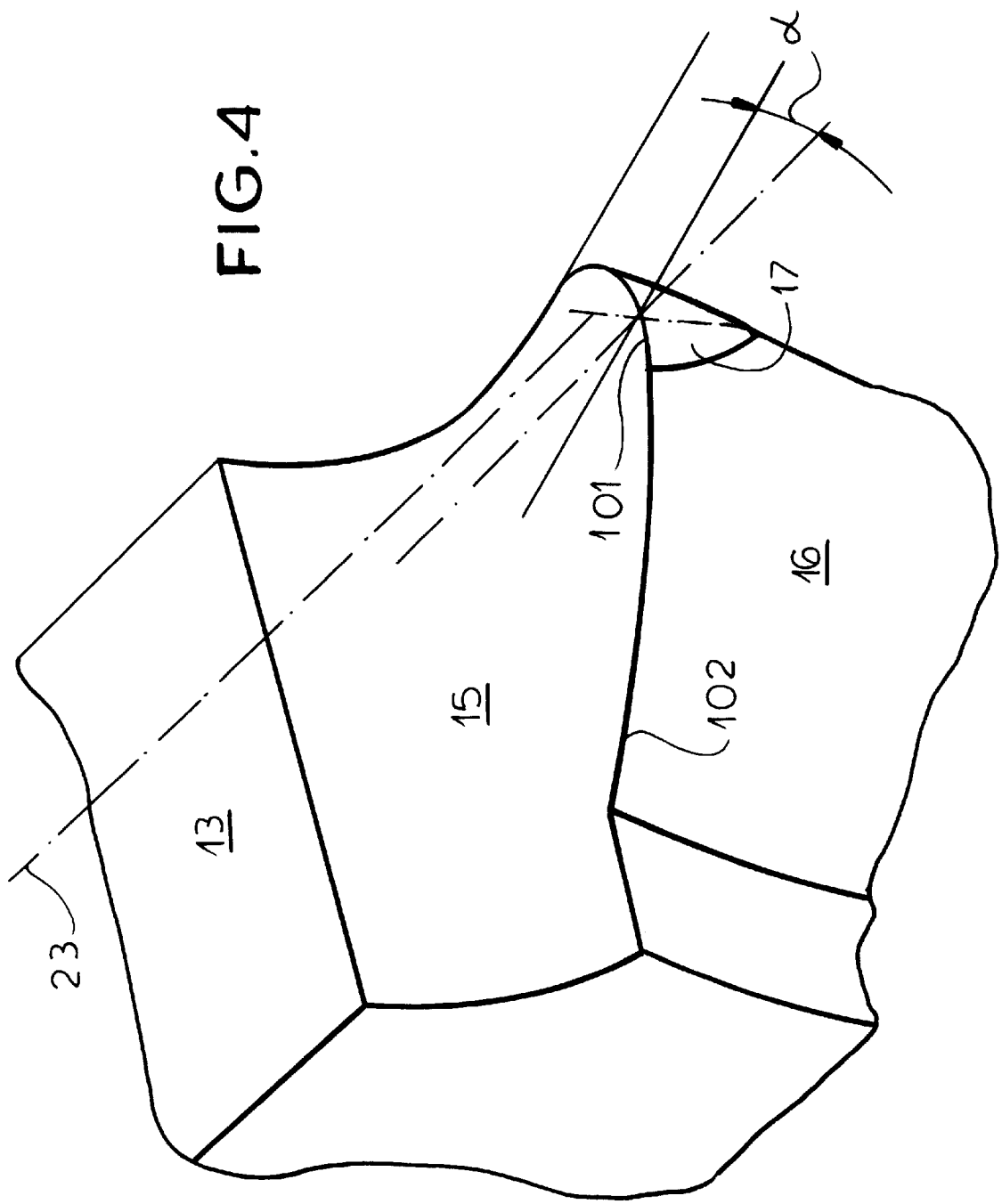
FIG. 4 is a large-scale perspective view of a cutting recess and the adjacent free-face region.
Figure 7A:
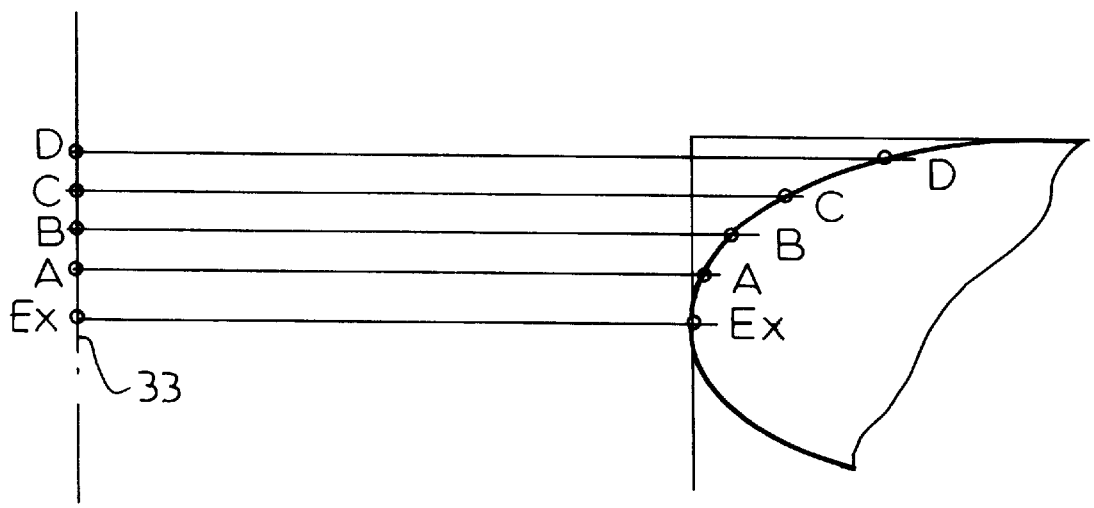
FIGS. 7a and 7b are schematic representations of the radius of curvature of the free face.
Figure 7B:
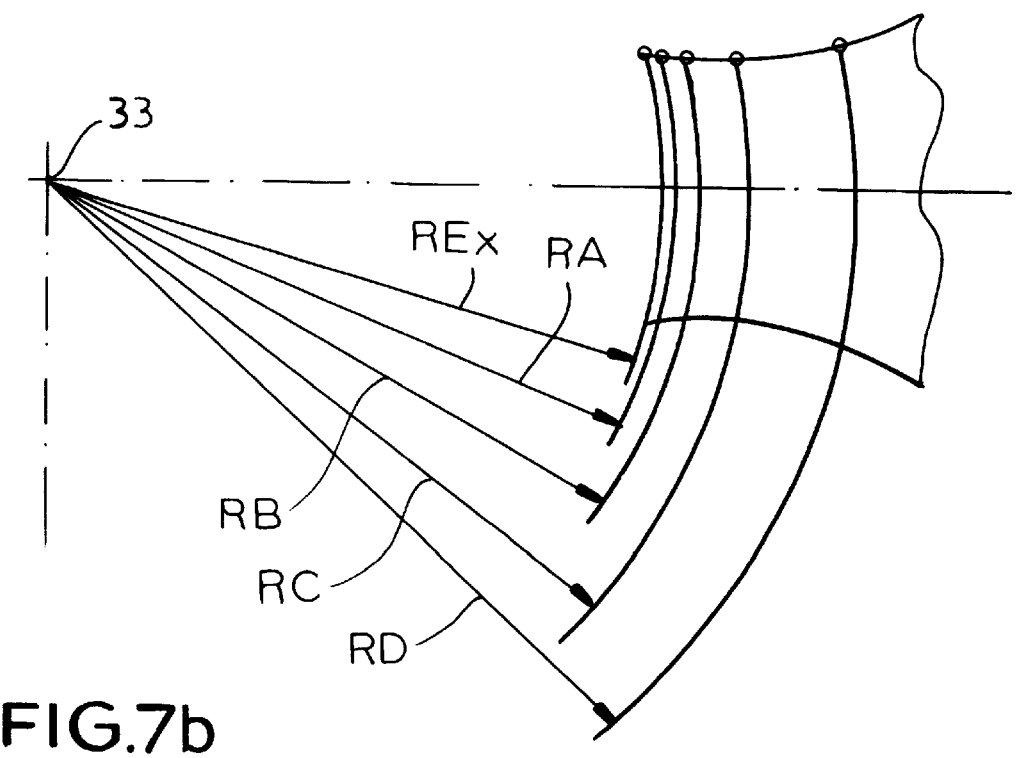

A substantial characterizing feature is the concave shape of the free face 16 that is shaped as shown in FIGS. 7A and 7B in a concrete embodiment such that the centers of the radii $R_A$, $R_B$, $R_C$, and $R_D$ of curvature lie on a common line 33. Below one portion of the concave cutting-edge part 101 is a free-face region 17 that is arranged at a free angle of 0°. As shown in detail in FIG. 1, the rear free-face regions 171 and 172 provide support at the rear in the cutting-plate seat while the face 14 serves as mounting face. The cutting angle α FIGS. 4 is between 0° and 30°, preferable about 20°, measured parallel to the longitudinal axis 23 of the cutting insert.

Figure 5:
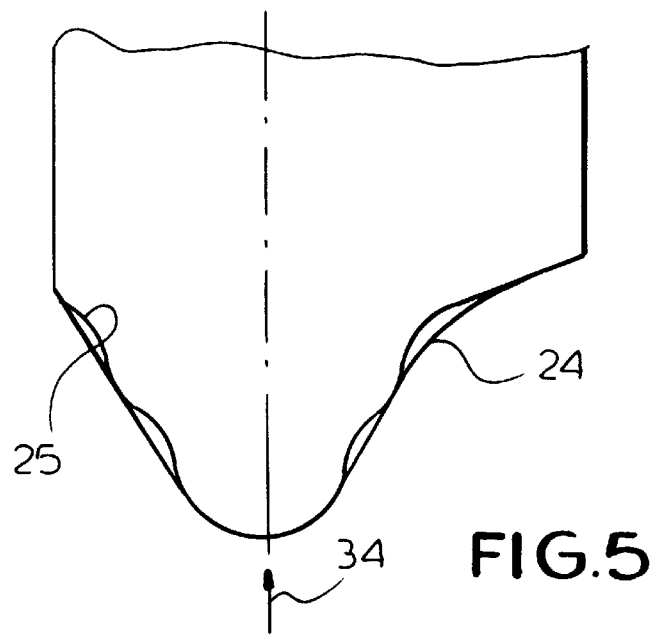
FIG. 5 is a top view of a cutting face with a wavy edge.
Figure 6A:
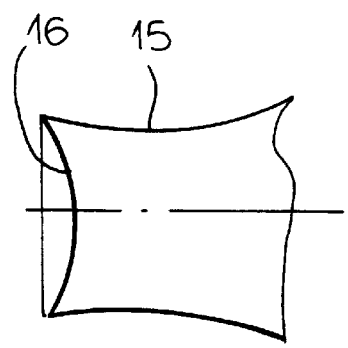
FIGS. 6a to 6d are side view of differently shaped cutting faces.
Figure 6C:
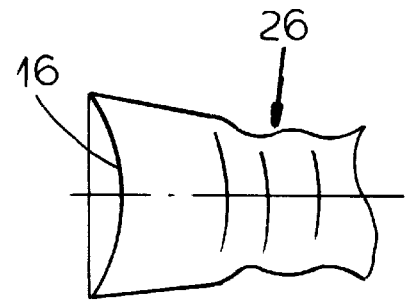
Figure 6B:
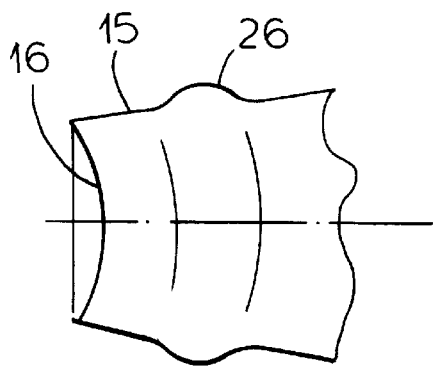
Figure 6D:
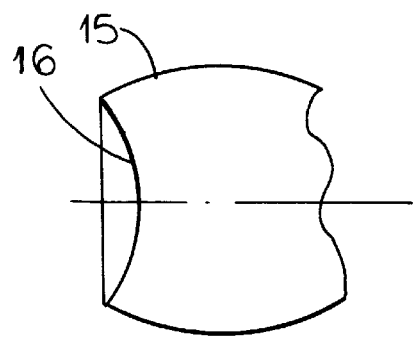

Instead of the cutting edge shown in FIGS. 1 to 4, a cutting edge can be used which runs along a line 24 following the convex or concave shape of the cutting-edge parts 101 and 102 but with a wavy cutting edge 25 (see FIG. 5). The cutting edge is shaped such that seen in the direction of arrow 34 each point on the wavy line 25 is visible, that is there are no undercuts. The individual teeth preferably have a flank angle β between 5° and 25°. As visible in FIGS. 6a to 6d the cutting face 15 can be concave, convex, or planar, with a positive, 0°, or negative cutting angle. FIGS. 6c and 6b show embodiments with chip-shaping elements 26, namely a (double) chip-shaping groove and a raised chip-shaping element. The cutting edge 10 can lie in a plane inclined at an acute angle to or parallel to the support face and can also be convex, concave, and/or wavy (seen in end view). The cutting insert described so far has four usable cutting edges 10.

Figure 8:
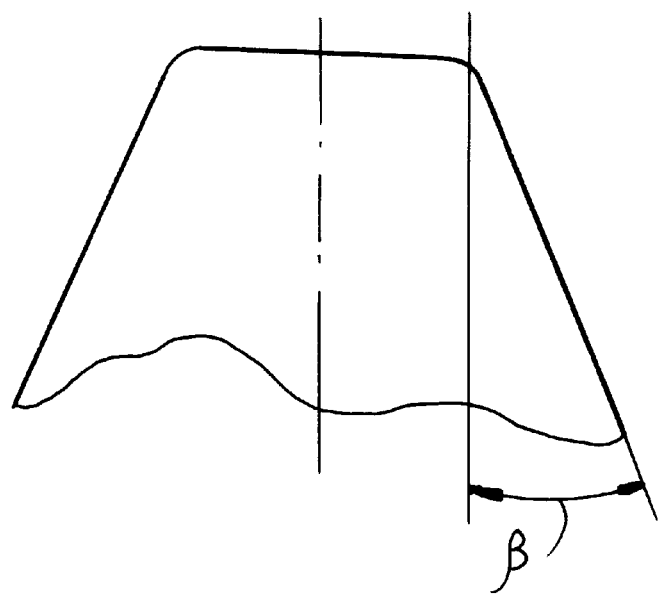
FIG. 8 is an enlarged detail view of an end tip (tooth) according to FIG. 5.
Figure 9:
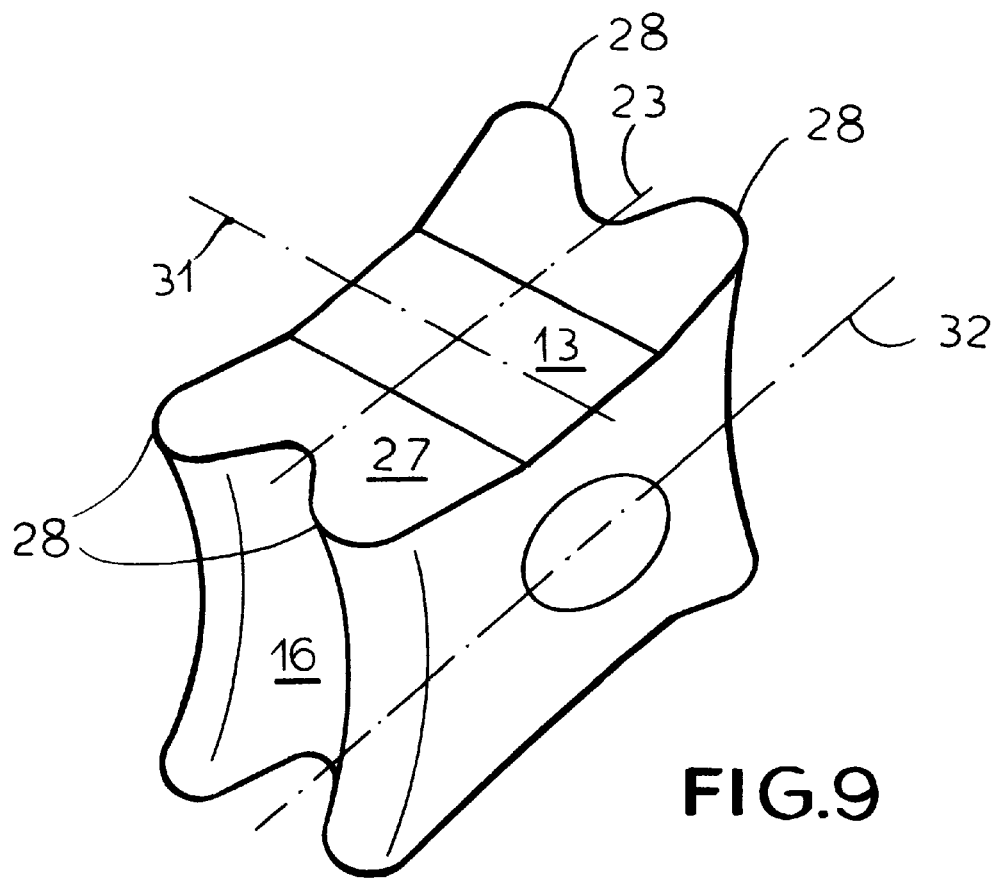
FIG. 9 is another cutting insert with eight usable cutting edges.

According to a further embodiment of the invention as shown in FIG. 8 it is possible to double the usable cutting edges in that the previously described cutting insert is replicated on a smaller side face 27 that lies opposite the side face 12. In this manner there are four usable cutting edges 28 on each side with the above-described shapes. The cutting insert is symmetrical to the axes 23, 31, and 32.

What is claimed is:

1. A cutting insert having a generally parallepipedal body formed with:

a pair of generally rectangular, planar, and parallel side faces extending between ends of the body;

a mounting formation at at least one of the side faces;

a pair of opposite edge faces between the side faces and each forming at each of the ends of the body a cutting face bounded by an at least partially arcuate and outwardly convex cutting edge; and a respective pair of at least partially circularly arcuate and outwardly concave free faces at each end extending between the respective cutting edges.

2. The cutting insert defined in claim 1 wherein each cutting edge has a convex part and another nonconvex part.

3. The cutting insert defined in claim 2 wherein the other nonconvex part is concave.

4. The cutting insert defined in claim 2 wherein the other nonconvex part is straight.

5. The cutting insert defined in claim 1 wherein the body is formed at each end and at each cutting edge between the respective free faces with a face region, the free faces being concave except at the respective face regions.

6. The cutting insert defined in claim 1 wherein each free faces have radii of curvature with centers lying on a common straight line.

7. The cutting insert defined in claim 1 wherein each cutting face forms at the respective cutting edge a cutting angle of between 0° and 30°.

8. The cutting insert defined in claim 1 wherein the cutting edges are wavy and have convex and concave parts.

9. The cutting insert defined in claim 8 wherein the wavy cutting edges form teeth having flank angles between 5° and 25°.

10. The cutting insert defined in claim 1 wherein the body forms at each end of each edge face two such cutting edges each defined by two such free faces.

11. The cutting insert defined in claim 1 wherein the mounting formation is a hole extending between the side faces.

* * * * *